(12) United States Patent
Wong et al.

(10) Patent No.: US 9,519,677 B2
(45) Date of Patent: Dec. 13, 2016

(54) DATA GRAPHING METHODS, ARTICLES OF MANUFACTURE, AND COMPUTING DEVICES

(75) Inventors: Pak Chung Wong, Richland, WA (US); Patrick S. Mackey, Richland, WA (US); Kristin A. Cook, Richland, WA (US); Harlan P. Foote, Richland, WA (US); Lynn-Marie Peashka, legal representative, Culdesac, ID (US); Mark A. Whiting, Richland, WA (US)

(73) Assignee: Battelle Memorial Institute, Boise, ID (US)

( * ) Notice: Subject to any disclaimer, the term of this patent is extended or adjusted under 35 U.S.C. 154(b) by 344 days.

(21) Appl. No.: 13/268,110

(22) Filed: Oct. 7, 2011

(65) Prior Publication Data

US 2012/0143849 A1    Jun. 7, 2012

Related U.S. Application Data

(60) Provisional application No. 61/391,257, filed on Oct. 8, 2010.

(51) Int. Cl.
*G06F 17/30* (2006.01)

(52) U.S. Cl.
CPC .............. *G06F 17/30383* (2013.01)

(58) Field of Classification Search
CPC .................................. G06F 17/30383
USPC ........................................ 707/722
See application file for complete search history.

(56) References Cited

U.S. PATENT DOCUMENTS

| | | | |
|---|---|---|---|
| 5,515,487 A | 5/1996 | Beaudet et al. | |
| 6,437,799 B1 | 8/2002 | Shinomi | |
| 6,462,762 B1 * | 10/2002 | Ku et al. | 715/853 |
| 6,560,647 B1 * | 5/2003 | Hafez | H04L 43/06 |
| | | | 709/223 |
| 6,711,577 B1 | 3/2004 | Wong et al. | |
| 6,952,208 B1 | 10/2005 | Arquie et al. | |
| 7,056,724 B2 | 6/2006 | Wong et al. | |
| 7,177,452 B2 | 2/2007 | Wong et al. | |
| 7,190,839 B1 * | 3/2007 | Feather et al. | 382/240 |

(Continued)

OTHER PUBLICATIONS

"A dynmic multiscale magnifying tool for exploring large sparse graphs" Wong et al 2008.*

(Continued)

*Primary Examiner* — Tarek Chbouki
(74) *Attorney, Agent, or Firm* — Wells St. John P.S.

(57) ABSTRACT

Data graphing methods, articles of manufacture, and computing devices are described. In one aspect, a method includes accessing a data set, displaying a graphical representation including data of the data set which is arranged according to a first of different hierarchical levels, wherein the first hierarchical level represents the data at a first of a plurality of different resolutions which respectively correspond to respective ones of the hierarchical levels, selecting a portion of the graphical representation wherein the data of the portion is arranged according to the first hierarchical level at the first resolution, modifying the graphical representation by arranging the data of the portion according to a second of the hierarchal levels at a second of the resolutions, and after the modifying, displaying the graphical representation wherein the data of the portion is arranged according to the second hierarchal level at the second resolution.

26 Claims, 13 Drawing Sheets

(56) References Cited

U.S. PATENT DOCUMENTS

| | | | |
|---|---|---|---|
| 7,203,701 | B1 | 4/2007 | Packebush et al. |
| 7,468,727 | B2 | 12/2008 | Wong et al. |
| 7,539,677 | B1 | 5/2009 | Wong et al. |
| 7,557,805 | B2 | 7/2009 | Wong et al. |
| 8,073,859 | B2 | 12/2011 | Wong et al. |
| 8,126,804 | B2 | 2/2012 | Huang et al. |
| 9,003,319 | B2* | 4/2015 | Linthicum .......... G06F 19/3406 715/771 |
| 2002/0015042 | A1* | 2/2002 | Robotham ................ G06F 3/14 345/581 |
| 2004/0221259 | A1* | 11/2004 | Devore, Jr. ........... G06F 9/4443 717/102 |
| 2004/0252128 | A1* | 12/2004 | Hao et al. ..................... 345/581 |
| 2007/0185904 | A1* | 8/2007 | Matsuzawa et al. ...... 707/104.1 |
| 2010/0049766 | A1* | 2/2010 | Sweeney ........... G06F 17/30705 707/737 |
| 2011/0219324 | A1* | 9/2011 | Watanabe et al. ............ 715/771 |
| 2013/0173667 | A1* | 7/2013 | Soderberg ............. G06T 11/206 707/798 |
| 2014/0006982 | A1* | 1/2014 | Wabyick ............... G06F 17/212 715/763 |

OTHER PUBLICATIONS

Abello et al., "Matrix Zoom: A Visual Interface to Semi-External Graphs", IEEE Symposium on Information Visualization (2004), 8 pages.

Abrams, "Measurement of Interactive Response Time", Federal Information Processing Standards Publication 57 (Aug. 1, 1978), pp. 10-24.

Albert et al., "Statistical Mechanics of Complex Networks", Reviews of Modern Physics vol. 74 (Jan. 2002), pp. 47-97.

Analyst's Notebook, http://www.i2inc.com, accessed Oct. 6, 2011, 1 page.

Aris et al., "Designing Semantic Substrates for Visual Network Exploration", Information Visualization vol. 4, No. 6 (2007), pp. 1-20.

Barnard et al., "A Fast Multilevel Implementation of Recursive Spectral Bisection for Partitioning Unstructured Problems", Concurrency: Practice and Experience vol. 6 (1994), 19 pages.

Bier et al., "Toolglass and Magic Lenses: The See-Through Interface", Proceedings of Siggraph (1993), pp. 73-80.

Brandes et al., "An Experimental Study on Distance-Based Graph Drawing (Extended Abstract)", Springer-Verlag (2009), pp. 1-12.

Chen, "The Centrality of Pivotal Points in the Evolution of Scientific Networks", Proceedings of the 10th International Conference on Intelligent User Interfaces (IUI), (2005), pp. 98-105.

Eades et al., "Multilevel Visualization of Clustered Graphs," Springer-Verlag 1190 (1996), pp. 1-12.

Ellis et al., "The Plot, the Clutter, the Sampling and its Lens: Occlusion Measures for Automatic Clutter Reduction", AVI '06, Venice (2006), 4 pages.

Fruchterman et al., "Graph Drawing by Force-Directed Placement", Software-Practice & Experience vol. 21 (1991), pp. 1129-1164.

Gansner et al., "Topological Fisheye Views for Visualizing Large Graphs", IEEE CS Press (2005), 8 pages.

GD2008, "16th International Symposium on Graph Drawing" (2008), http://www.gd2008.org/, 1 page.

GD2009, "17th International Symposium on Graph Drawing" (2009), http://facweb.cs.depaul.edu/gd2009/cfp.asp, 3 pages.

Google Earth, http://earth.google.com (accessed Feb. 28, 2008), 2 pages.

Grimes, "On the Failure to Detect Changes in Scenes across Saccades", Vancouver Studies in Cognitive Science, vol. 2: Perception, editor K. Akins, New York: Oxford University Press (1996), pp. 89-110.

Grinstein et al., "VAST 2008 Challenge: Introducing Mini-Challenges", Proceedings IEEE Symposium on Visual Analytics Science and Technology (VAST) (October 2008), pp. 195-196.

Hachul et al., "Large-Graph Layout Algorithms at Work: An Experimental Study", Journal of Graph Algorithms and Applications vol. 11, No. 2 (2007), pp. 345-369.

Harel et al., "A Fast Multi-Scale Method for Drawing Large Graphs", Journal of Graph Algorithms and Applications vol. 6, No. 3 (2002), pp. 179-202.

Henry et al., "NodeTrix: A Hybrid Visualization of Social Networks", IEEE Transactions on Visualization and Computer Graphics (TVCG) vol. 13, No. 6 (2007), pp. 1302-1309.

Herman et al., "Graph Visualization and Navigation in Information Visualization: A Survey", IEEE Transactions on Visualization and Computer Graphics vol. 6 (2000), 21 pages.

IEEE Information Visualization Conference (IEEE InfoVis), http://vis.computer.org/VisWeek2009/infovis/ (2009), 1 page.

IEEE Symposium on Visual Analytics Science and Technology (VAST), (2009), http://vis.computer.org/VisWeek2009/vast, 1 page.

InfoVis 2008, "IEEE Information Visualization Conference 2008", http://vis.computer.org/VisWeek2008/infovis/index.html (accessed Feb. 29, 2008), 1 page.

Kamada et al., "An Algorithm for Drawing General Undirected Graphs", Information Processing Letters vol. 31 (1989), pp. 7-15.

Keahey et al., "Nonlinear Magnification Fields", Proceedings IEEE Symposium on Information Visualization, IEEE CS Press (1998), (Research Triangle Park, NC), pp. 1-12.

Kolda et al., "Data Sciences Technology for Homeland Security Information Management and Knowledge Discovery", Lawrence Livermore National Labratory (Jan. 11, 2005), 43 pages.

Lesne, "Complex Networks: From Graph Theory to Biology", Letters in Mathematical Physics (2006), pp. 1-21.

Medini et al., "Protein Homology Network Families Reveal Step-Wise Diversification of Type III and Type IV Secretion Systems", PLOS Computational Biology vol. 2, No. 12 (2006), pp. 1543-1551.

Microsoft Magnifier, http://www.microsoft.com/enable/training/windowsxp/magnifierturnon.aspx (accessed Feb. 4, 2008), 2 pages.

Milgram, "The Small World Problem", Psychology Today vol. 1, No. 1 (1967), pp. 61-67.

Noack, "Energy Models for Graph Clustering", Journal of Graph Algorithms and Applications vol. 11, No. 2 (2007), pp. 453-480.

NVAC, "National Visualization and Analytics Center", http://nvac.pnl.gov; last updated Sep. 14, 2011, 2 pages.

Pajek, http://vlado.fmf.uni-lj.si/pub/networks/pajek/ (accessed Apr. 5, 2008), 1 page.

Rensink et al., "On the Failure to Detect Changes in Scenes Across Brief Interruptions", Visual Cognition, vol. 7 (2000), pp. 127-145.

Shannon et al., "Cytoscape: A Software Environment for Integrated Models in Biomolecular Interaction Networks", Genome Research vol. 13 (2003), pp. 2498-2504.

Shneiderman, "Network Visualization by Semantic Substrates", IEEE Transactions on Visualization and Computer Graphics vol. 12, No. 5 (2006), 8 pages.

Starlight, http://starlight.pnl.gov; last updated May 2008, 1 page.

Stasko et al. "Jigsaw: Supporting Investigative Analysis Through Interactice Visualization", Information Visualization, Plagrave Magellan vol. 7, No. 2 (2008), pp. 118-132.

Stone et al., "The Movable Filter as a User Interface Tool", Proceedings of the SIGCHI Conference on Human Factors in Computing Systems (1994), pp. 306-312.

Tom Saywer Software, http://www.tomsawyer.com/home/index.php (accessed Feb. 26, 2008), 1 page.

Tulip, Tulip-Software.org, http://www.labri.fr/perso/auber/projects/tulip/, accessed May 5, 2007, 4 pages.

van Ham et al., "Interactive Visualization of Small World Graphs", Proceedings IEEE Symposium on Information Visualization (InfoVis) IEEE CS Press (2004), pp. 199-206.

Walshaw, "A Multilevel Algorithm for Force-Directed Graph-Drawing", Journal of Graph Algorithms and Applications vol. 7, No. 3 (2003), pp. 253-285.

Watts et al., "Collective Dynamics of Small-World Networks", Nature vol. 393 (1998), pp. 440-442.

Whiting et al., "Threat Stream Data Generator: Creating the Known Unknowns for Test and Evaluation of Visual Analytics Tools", BELIV ACM Press (May 23, 2006), pp. 1-3.

(56) References Cited

OTHER PUBLICATIONS

Wong et al., "A Multi-Level Middle-Out Cross-Zooming Approach for Large Graph Analytics", Pacific Northwest National Laboratory (2009), 8 pages.

Wong et al., "Dynamic Visualization of Graphs with Extended Labels.", Proceedings of the IEEE Symposium on Information Visualization (2005), pp. 73-80.

Wong et al., "EdgeLens: An Interactive Method for Managing Congestion in Graphs", Proceedings IEEE Symposium on Information Visualization (2003), pp. 51-58.

Wong et al., "Generating Graphs for Visual Analytics through Interactive Sketching" IEEE Transactions on Visualization and Computer Graphics vol. 12, No. 6 (2006), pp. 1386-1398.

Wong et al., "Graph Signatures for Visual Analytics", IEEE Transactions on Visulization and Computer Graphics vol. 12, No. 6 (2006), pp. 1399-1413.

Wong et al., "Have Green—A Visual Analytics Framework for Large Semantic Graphs", Proceedings of the IEEE Symposium on Visual Analytics Science and Technology (2006), Baltimore, MD, pp. 67-74.

Wong et al., "A Dynamic Multiscale Magnifying Tool for Exploring Large Sparse Graphs", Information Visualization, Palgrave McMillan vol. 7, No. 2 (2008), pp. 105-117.

\* cited by examiner

Author Name

[                    ]  [Query]

Author ID

[                    ]  [Query]

Last Reference Date — range 1/8/2000 to 11/12/2003, selected 1/8/2000 to 7/4/2000

Publication Date — range 1/1/2000 to 11/29/2000, selected 7/5/2000 to 11/29/2000

Included in Library Collection  ☐ Yes  ☑ No

First Tier Journal  ☑ Yes  ☐ No

Full Document  ☑ Yes  ☐ No

C8 Field:
- ☐ Computer Programming
- ☐ Aotomats Theory
- ☐ Compiler Theory
- ☐ Programming Languages
- ☑ Visualization Publication type:
- ☐ Technical Report
- ☐ Other
- ☑ Presentation
- ☐ Thesis
- ☐ Monograph

[Go]  [Clear]

*FIG. 6*

DATA GRAPHING METHODS, ARTICLES OF MANUFACTURE, AND COMPUTING DEVICES

RELATED PATENT DATA

This application claims priority to U.S. Provisional Patent Application Ser. No. 61/391,257, filed Oct. 8, 2010, entitled "A Multi-Level Middle-Out Cross-Zooming Approach for Large Graph Analytics," the disclosure of which is incorporated by reference.

STATEMENT AS TO RIGHTS TO INVENTIONS MADE UNDER FEDERALLY-SPONSORED RESEARCH AND DEVELOPMENT

This invention was made with Government support under Contract DE-AC0576RLO1830 awarded by the U.S. Department of Energy. The Government has certain rights in the invention.

TECHNICAL FIELD

This disclosure relates to data graphing methods, articles of manufacture, and computing devices.

BACKGROUND OF THE DISCLOSURE

Graph analytics is a way of facilitating guided graph exploration through visual and interactive means. Unlike many graph visualization research efforts that focus predominantly on layout algorithms and rendering techniques, graph analytics research strives to provide an engaging interactive journey that bridges the gap from data to information to knowledge. Graph visualization still plays an important role in building this analytical journey, as do database querying, graph mining, interactive interrogation, human judgment and senses.

Two primary schools of thought have developed when designing graph analytics tools: top-down and bottom-up. The top-down approach often provides an initial full view of the entire dataset and then gradually reaches out to the local details. The bottom-up approach frequently starts with seed nodes or a subset of nodes, and then builds the rest of the graph through associations. These graph analytics tools are suited to different tasks or goals.

This disclosure relates to methods and apparatus for creating graphical representations of data sets. In some embodiments described herein, methods and apparatus are directed to a working graph analytics model which exploits vast middle-ground information which may be overlooked by the two above-mentioned analytical approaches. Other embodiments are also disclosed herein.

BRIEF DESCRIPTION OF THE DRAWINGS

Exemplary embodiments of the disclosure are described below with reference to the following accompanying drawings.

FIG. 6 is a user interface window which an analyst may interact with during analysis of a graphical representation of a data set according to one embodiment.

DETAILED DESCRIPTION OF THE DISCLOSURE

Figure 1:
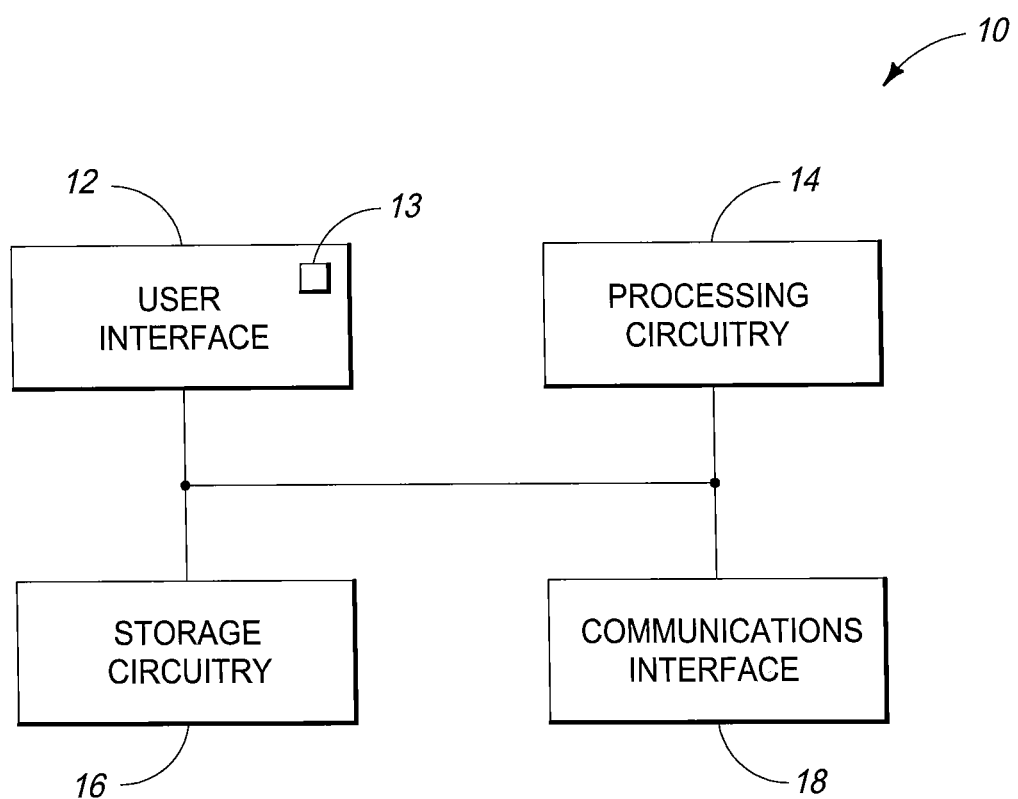
FIG. 1 is a functional block diagram of a computing device according to one embodiment.

Some aspects of the present disclosure relate to a working graph analytics model. As described herein, one embodiment of the disclosure includes one or more analytical features including generating a multi-level hierarchy (e.g., different degrees of resolution or coarseness of a graph), enabling middle-out analysis of graphs starting at an intermediate hierarchical level, and cross-zooming across a plurality of different hierarchical levels. Additional embodiments and aspects are described herein.

According to one embodiment, a data graphing method comprises accessing a data set, displaying a graphical representation including data of the data set which is arranged according to a first of a plurality of different hierarchical levels, wherein the first hierarchical level represents the data of the data set at a first of a plurality of different resolutions which respectively correspond to respective ones of the hierarchical levels, selecting a portion of the graphical representation wherein the data of the portion is arranged according to the first hierarchical level at the first resolution, modifying the graphical representation by arranging the data of the portion according to a second of the hierarchal levels at a second of the resolutions, and after the modifying, displaying the graphical representation wherein the data of the portion is arranged according to the second hierarchal level at the second resolution.

According to an additional embodiment, an article of manufacture comprises at least one computer-readable storage medium storing programming configured to cause processing circuitry to perform processing comprising first displaying a first graphical representation of a data set wherein data of the data set is arranged at an intermediate resolution, selecting a portion of the first graphical representation, arranging data which corresponds to the selected portion of the first graphical representation according to one of an increased resolution and a decreased resolution compared with the intermediate resolution, after the arranging, second displaying a second graphical representation including the data of the data set at the intermediate resolution and the one of the increased and decreased resolutions.

According to another embodiment, a computing device comprises a display screen configured to display a graphical representation of a data set, a user interface configured to receive user inputs of a user interacting with the computing device, and processing circuitry coupled with the display screen and the user interface and configured to access one of the user inputs which selects a portion of the graphical representation and which instructs the processing circuitry to modify the graphical representation to represent data of the data set corresponding to the portion at a first resolution and to represent other data of the data set at a second resolution which is different than the first resolution and to control the display screen to display the modified graphical representation which represents the data of the data set at the first and second resolutions.

Referring to FIG. 1, an example embodiment of a computing device 10 is shown which is configured to process data of a data set to generate a graphical representation of the data of the data set. In one embodiment, computing device 10 is configured to implement a working graph analytics model. The computing device 10 may be implemented in any appropriate computing hardware configuration. For example, the illustrated computing device 10 includes a user interface 12, processing circuitry 14, storage circuitry 16 and a communications interface 18. Computing device 10 may include more, less and/or alternative components in other embodiments.

User interface 12 is configured to interact with a user and may include a display screen 13 to convey data to a user (e.g., displaying visual images for observation by the user) as well as one or more input device 15 (e.g., keyboard, mouse, etc.) configured to receive inputs, such as data queries, from the user. User interface 12 may be configured differently in other embodiments.

In one embodiment, processing circuitry 14 is arranged to process data, control data access and storage, issue commands, and control other desired operations. For example, processing circuitry 14 may process data of a data set to generate graphical representations of the data set. The processing circuitry 14 may also process the data set with respect to received user inputs and modify the graphical representations of the data responsive to the received user inputs in one example. As discussed in detail below in one embodiment, the processing circuitry 14 may display the graphical representations of the data at different hierarchical levels of resolution or coarseness (e.g., multi-level hierarchy) to assist with analysis operations of the data wherein analysts can capriciously and concurrently access both finer and coarser details of the underlying graph.

Processing circuitry 14 may comprise circuitry configured to implement desired programming provided by appropriate computer-readable storage media in at least one embodiment. For example, the processing circuitry 14 may be implemented as one or more processor(s) and/or other structure configured to execute executable instructions including, for example, software and/or firmware instructions. Other exemplary embodiments of processing circuitry 14 include hardware logic, PGA, FPGA, ASIC, state machines, and/or other structures alone or in combination with one or more processor(s). These examples of processing circuitry 14 are for illustration and other configurations are possible.

Storage circuitry 16 is configured to store programming such as executable code or instructions (e.g., software and/or firmware), electronic data, databases, image data, or other digital information and may include computer-readable storage media. At least some embodiments or aspects described herein may be implemented using programming stored within one or more computer-readable storage medium of storage circuitry 16 and configured to control appropriate processing circuitry 14.

The computer-readable storage medium may be embodied in one or more articles of manufacture which can contain, store, or maintain programming, data and/or digital information for use by or in connection with an instruction execution system including processing circuitry 14 in the exemplary embodiment. For example, exemplary computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Communications interface 18 is arranged to implement communications of computing system 10 with respect to external devices (not shown). For example, communications interface 18 may be arranged to communicate information bi-directionally with respect to computing system 10. Communications interface 18 may be implemented as a network interface card (NIC), serial or parallel connection, USB port, Firewire interface, flash memory interface, or any other suitable arrangement for implementing communications with respect to computing system 10. Communications interface 18 may be coupled with one or more networks, including the Internet. In one embodiment, communications interface 18 is configured to receive a data set to be processed for graph analytics.

In one example, various aspects of the disclosure may be implemented using Microsoft C# with .net framework and Microsoft DirectX 9 graphics. The underlying graph analytics and computation library is implemented using Microsoft C++ to ensure optimal performance of the library in one embodiment.

Figure 2:
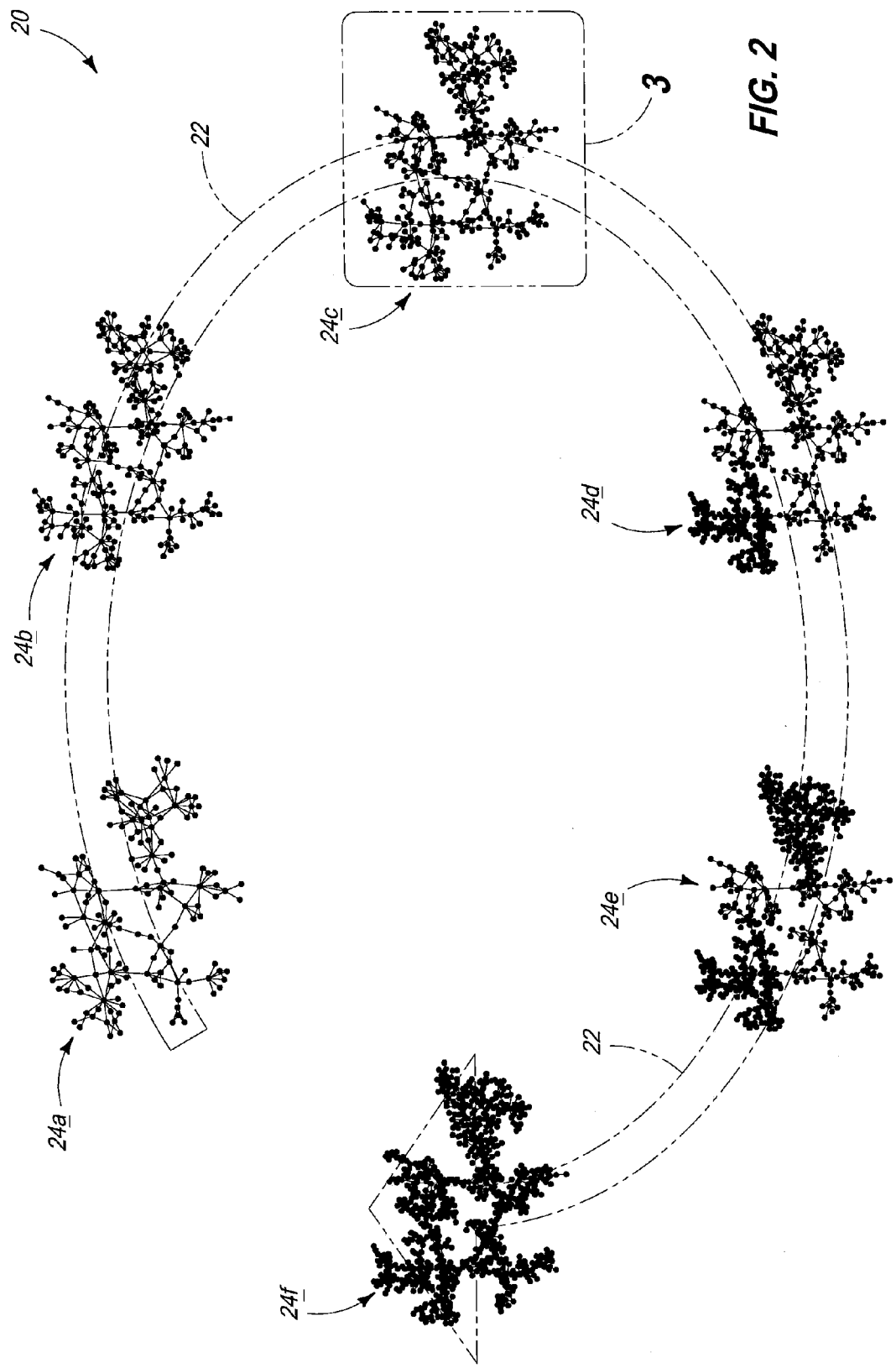
FIG. 2 is a conceptual illustration illustrating a plurality of graphical representations of a data set at a plurality of different hierarchical levels according to one embodiment.

Referring to FIG. 2, a conceptual illustration 20 including a plurality of examples of graphical representations 24a-24f generated by computing device 10 processing a common data set are shown at a plurality of hierarchical levels. Although the illustrated example shows the data being processed into graphical representations 24a-24f of six different hierarchical levels, the data of a data set may be processed into more or less hierarchical levels in other examples.

The illustrated example graphical representations 24a-24f are large small-world graphs including a plurality of nodes and links which associate the nodes with one another. The graphical representations 24a-24f at the plural hierarchical levels illustrate the data of the data sets at a plurality of different resolutions or degrees of coarseness (e.g., more or less nodes and links in one embodiment) while maintaining a substantially common shape. The arrow 22 illustrates the graphical representations increasing in resolution from graphical representation 24a to graphical representation 24f in the illustrated example. Details of one possible implementation of graphing data of a data set at a plurality of hierarchical levels are described in Pak Chung Wong, etc., "A Dynamic Multiscale Magnifying Tool For Exploring Large Sparse Graphs," *Information Visualization*, vol. 7, no. 2, pages 105-117, Palgrave McMillan 2008, the teachings of which are incorporated herein by reference. Other coarsening approaches may be utilized to generate a hierarchy of increasingly coarse layouts of a given graph in other embodiments.

In some embodiments, it is desired to utilize a multi-level coarsening approach which retains significant structural features at each level. Reducing too many nodes at a time (and thus a shallower hierarchy) may cause a loss of too much detail to support an effective recovery later. Contrarily, reducing too few nodes (and thus a deeper hierarchy), on the other hand, may lead to unnecessary computation for many fairly similar graphs in the hierarchy. In one embodiment, a coarsening approach known as matching that maintains an approximate 50% reduction rate at each level is utilized by merging nodes with the least number of connections to the nodes they are connected with. The merging process may continue until a 50% reduction rate is reached and the new coarser graphical representation would have no less than half the graph nodes of the previous (finer) graphical representation in one embodiment.

In one embodiment, both connected and disconnected graphs (e.g., graphs with isolated sub-graphs) may be processed into different hierarchical levels. In one embodiment, a matching strategy may be used to allow isolated nodes to be merged and in one additional example, isolated nodes may be paired with their closest neighbors in order to reduce the distraction caused by the animation and to attempt to maintain the "shape" of the graph at different visualization levels.

The processing of data of some relatively large data sets may result in graphical representations which include hundreds of thousands of nodes. Display screens typically have a maximum size (e.g., maximum number of pixels) and may not be able to display an entire graphical representation of a data set at the highest possible resolution due to limitations in screen size, pixels, etc.

As mentioned above, the illustration 20 is intended to show how data of an example data set may be processed into graphical representations 24a-24f of a plurality of different hierarchical levels. During the processing of data of a given data set during analysis, the computing device 20 may not need to generate all of the graphical representations 24a-24f. In one embodiment, different portions of a graphical representation may be depicted at different hierarchical levels with different corresponding resolutions. As discussed further below, a user may select different portions of a graphical representation to have increased or decreased resolution.

In one embodiment, the computing device 10 processes data of a data set to generate one of the graphical representations 24a-24f. In one embodiment, a middle-out approach is used where a graphical representation of the data arranged according to an intermediate hierarchical level at a respective intermediate resolution or coarseness is initially displayed to a user. The described example embodiment integrates behaviors of both top-down and bottom-up approaches with additional features such as interactive cross-zooming (described below) to exploit the vast middle-ground of the graph hierarchy.

For example, graphical representation 24c depicts the data arranged at an intermediate hierarchical level wherein the data of the data set is displayed at a corresponding intermediate resolution since the data may be arranged at increased resolutions in additional hierarchical levels 24d-24f or the data may be arranged at decreased resolutions in additional hierarchical levels 24a-24b. A user may interact with and modify the displayed graphical representation at the intermediate level (e.g., representation 24c) to analyze the data of the data set as described further below with respect to FIGS. 3-3D. The particular hierarchical level which is initially displayed to a user may be selected by user input in one embodiment, or automatically without user input in another embodiment (e.g., the highest resolution may be automatically displayed where the entire graphical representation may be displayed using the display screen). In one embodiment, the processing circuitry may automatically select (e.g., without user input) a hierarchical level of the initial graphical representation to be displayed based upon a size of the display screen and utilize a force-direct layout to draw the graphical representation at the selected hierarchical level. In one embodiment, the hierarchical level selection of the initially displayed graphical representation is a function of data size and number of available pixels. In one embodiment, the selection of a coarsened layout (instead of a full-resolution one) is to ensure the graph is drawn with clarity and conciseness, given the size of the graph and the number of display pixels available. Furthermore, in one implementation, users can interactively override an automatic selection and start with a finer or coarser view. Based on the initial view of the graph, the analysts can now interrogate the graph by querying the database and analyzing the results as described in additional detail below. The utilization of an intermediate hierarchical level in one embodiment enables analysts in some situations to see a glimpse of a graph as opposed to nothing at all in some other graphing techniques.

Figure 3:
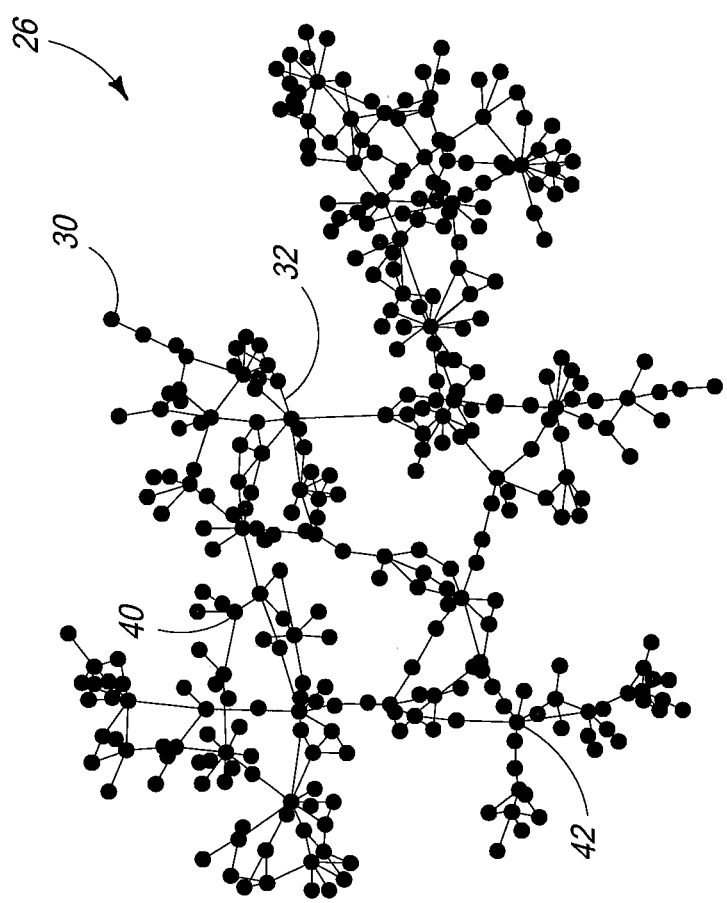
FIGS. 3-3D are illustrative representations where data of a data set are represented at different resolutions within a graphical representation of the data set according to one embodiment.

Referring initially to FIG. 3, a graphical representation 26 of the data of the data set may be initially displayed using the display screen 13 arranged at an intermediate hierarchical level. For example, graphical representation 26 corresponds to the intermediate level graphical representation 24c of FIG. 2. The example graphical representation 26 includes a plurality of nodes 30 and a plurality of links 32 which associate the nodes 30 with one another to represent the data of the data set and as a result of the processing of the data set.

As mentioned above, a user may interact with the displayed graphical representation 26 to analyze the data of the data set. In one embodiment, a user may select one or more portions of the graph in which additional detail (i.e., increased resolution) is desired and/or the user may select one or more portions of the graph in which less detail is desired. The computing device modifies the graphical representation which is displayed according to the user changes specifying that different portions of the graphical representation represent the data according to different resolutions.

In one embodiment, a user may submit queries against the data to select portions of the graphical representation 26 for modification. An example user interface for implementing user interaction with respect to the graphical representation 26 according to one embodiment is shown in FIG. 6. In another embodiment, the user may manipulate user input devices (e.g., a mouse) to directly select nodes or areas of the graphical representation 26 for modification, for example, by drawing a box around a desired portion of the graphical representation 26. Due to display capabilities (e.g., screen size, number of pixels, etc.) of a display screen 13, the graphical representation of the data may not be capable of being entirely displayed according to the highest hierarchical level at the highest resolution. In one embodiment, a user may select one or more portions of an intermediate graphical representation 26 for increased resolution and/or select one or more other portions of the graphical representation 26 for less resolution so the entire graphical representation 26 including the portions with the increased resolution may be displayed using the display screen. In other words, a display capability of the display screen 13 may constrain a portion of the data of the data set to be represented at a lower resolution compared with other portions of the data in one example embodiment.

Accordingly, at least one embodiment of the disclosure implements cross-zooming which refers to the simultaneous, concurrent, sequential, or separate zooming of graph details that stretches across both a foreground/background boundary (described further below with respect to FIGS. 5-5B in one example) as well as boundaries of individual different hierarchies. In one embodiment, users can zoom the entire foreground or background as well as reduce the background details and free up space for foreground details as described herein. In one embodiment, the computing device 10 may tie the foreground and background together to balance the amount of nodes to be displayed by automatically reducing the background details when the foreground details reach a certain limit (e.g., the user may select one or more portions for increased resolution and the processing circuitry may automatically show the non-selected portions at reduced resolutions according to the display capabilities). Additionally, users can also zoom individual nodes for finer details one at a time.

In one embodiment, when users increase the foreground resolution, the computing device 10 may split all selected nodes into the nodes that are on the next level in the coarsening tree. Any of the child nodes that contain a selected node are considered selected, and therefore part of the foreground in this embodiment. If any of the new child nodes are directly connected to a super-node (e.g., a node at a coarser level which represents plural nodes of a finer level as discussed below) that is selected, they are considered part of the foreground, but not selected if they do not contain a selected node in this example. If any of the new child nodes are neither selected nor connected directly to a foreground node (i.e., it is an island), then it is considered part of the background in this embodiment. If an individual selected super-node is clicked, this same process occurs, but for its child nodes only in one embodiment.

In one embodiment, when users reduce the foreground resolution, the computing device 10 first loops through all the visible super-nodes in the foreground and finds which ones are the least coarsened on the coarsening tree. Only the foreground nodes on the current least coarsened level are retracted in one embodiment. This is done so that a super-node that is near the top of the coarsening tree does not accidentally retract half the graph with it when only a small change is made by the user in this example. When foreground nodes retract, they can retract background nodes with them, but background nodes do not retract a foreground node into them in this example. Because of this, if there are some nodes in the foreground and some in the background, it will get to a point when the computing device 10 can no longer retract any more background nodes, even if some of them still appear in the view, because the computing device 10 would have to retract some of the foreground nodes to get rid of them (because they are connected through the coarsening tree) in this embodiment. These example zooming implementations may be based upon user preferences and other embodiments are possible.

Still referring to FIG. 3, two nodes 40, 42 are identified as being selected by a user interaction. For example, the nodes 40, 42 may correspond to one or more data item of the data set which satisfied a query from a user. In another example, nodes 40, 42 may have been directly selected by a user. The selected nodes 40, 42 may be displayed in a manner to stand out from non-selected nodes 30. For example, nodes 40, 42 may be displayed in a different color from the color of nodes 30. A user may desire to analyze other nodes 30 which are proximate to the selected nodes 40, 42 to gain additional information of interest.

Figure 3A:
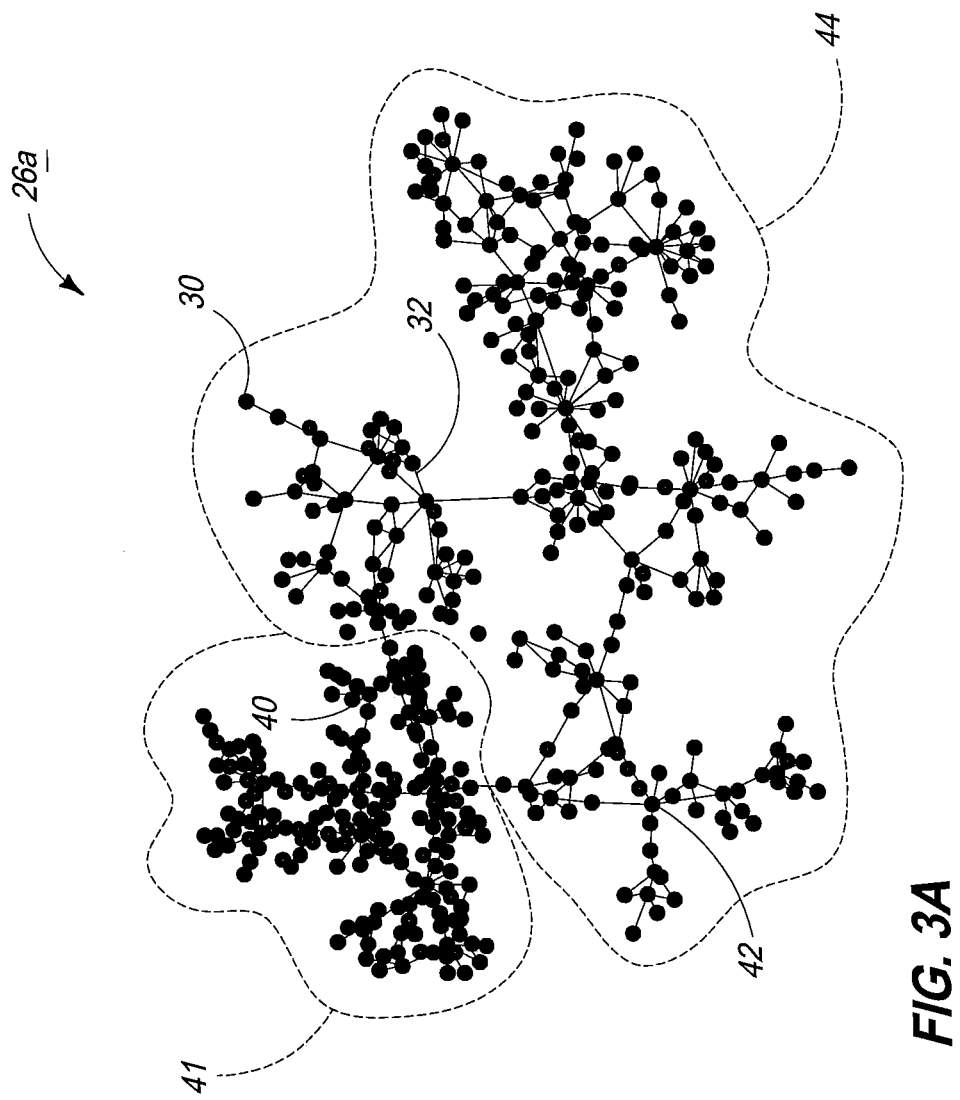

Referring to FIG. 3A, a user has selected and modified a portion 41 of the graphical representation 26a to see additional details proximate node 40. For example, the user may utilize a mouse to select portion 41 and the user may increase the resolution of the selected portion 41 of the graphical representation 26a. In the illustrated example, the new resolution of portion 41 corresponds to the increased resolution of graphical representation 24d of FIG. 2. In one embodiment, the shape and location of the portion 41 after the modification is generally consistent with the shape and location of the portion 41 prior to the modification although the data of the portion 41 is represented at different resolutions (e.g., different numbers of nodes represent the data of the portion 41) before and after the modification.

In addition, some information regarding data of the selected portion 41 may only be discernable in higher hierarchical levels with increased resolutions and not discernable in one or more lower hierarchical level in one embodiment. For example, a plurality of nodes of a higher hierarchical level may be compressed into a single node at a lower hierarchical level, and accordingly, the details regarding the nodes which are compressed at the lower hierarchical level may not be discernable within a representation of the data at the lower hierarchical level in one embodiment.

In FIG. 3A, the resolution of portion 44 of the graphical representation 26a has not been modified. However, as mentioned previously, the display screen 13 may have inherent display limitations which limit the number of nodes 30 which may be simultaneously displayed.

Figure 3B:
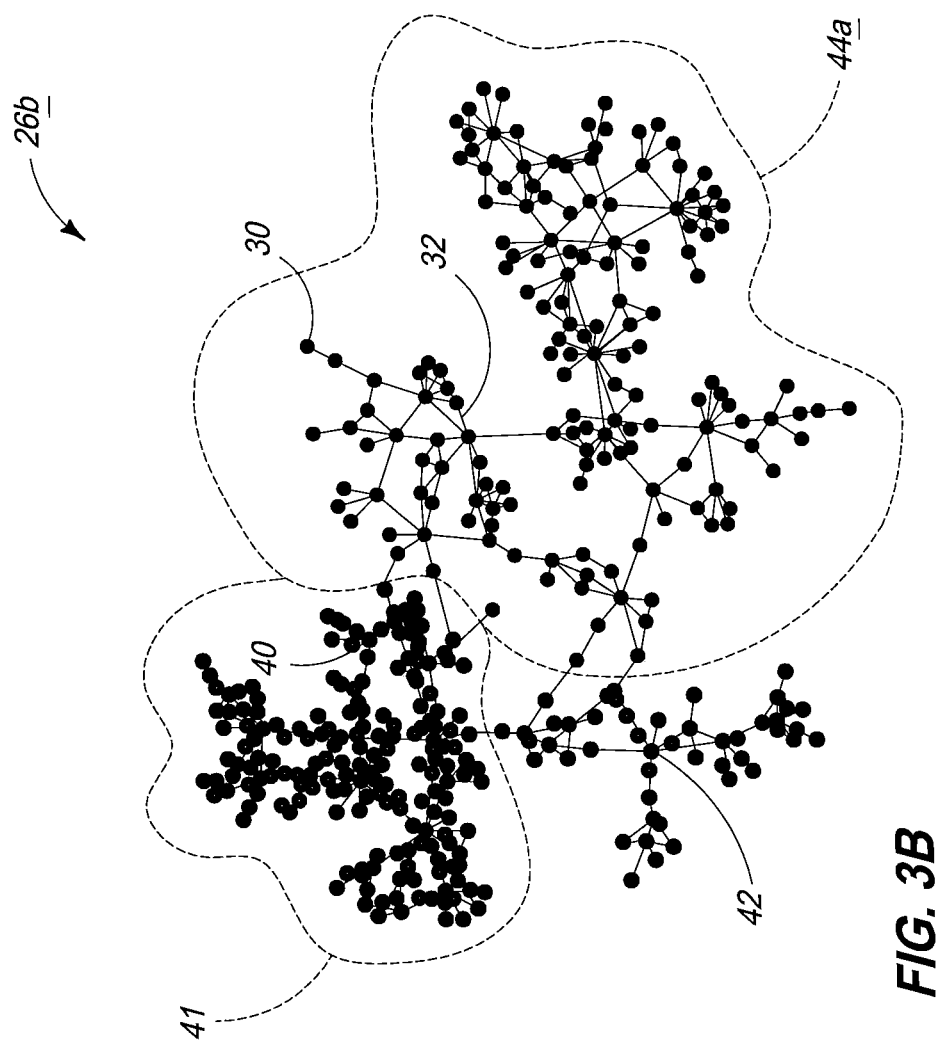

Accordingly, referring to FIG. 3B, a user may decrease the resolution of portion 44a of graphical representation 26b, separately or in conjunction with increasing the resolution of portion 41. In the illustrated example, the user has decreased the resolution of portion 44a in a manner which corresponds to the decreased resolution of graphical representation 24a of FIG. 2. For example, the user selected portion 44a for decreasing the resolution since portion 44a did not contain any nodes of interest to the user. In another embodiment, if the processing circuitry detects that the increase of the resolution of portion 41 will exceed the display capabilities of the display screen, the processing circuitry may automatically modify another portion of the graphical representation (e.g., portion 44a which does not include a node of interest to the user) to a lesser resolution without user input such that an entirety of the graph of the data of the data set may be simultaneously displayed using the display screen.

Figure 3C:
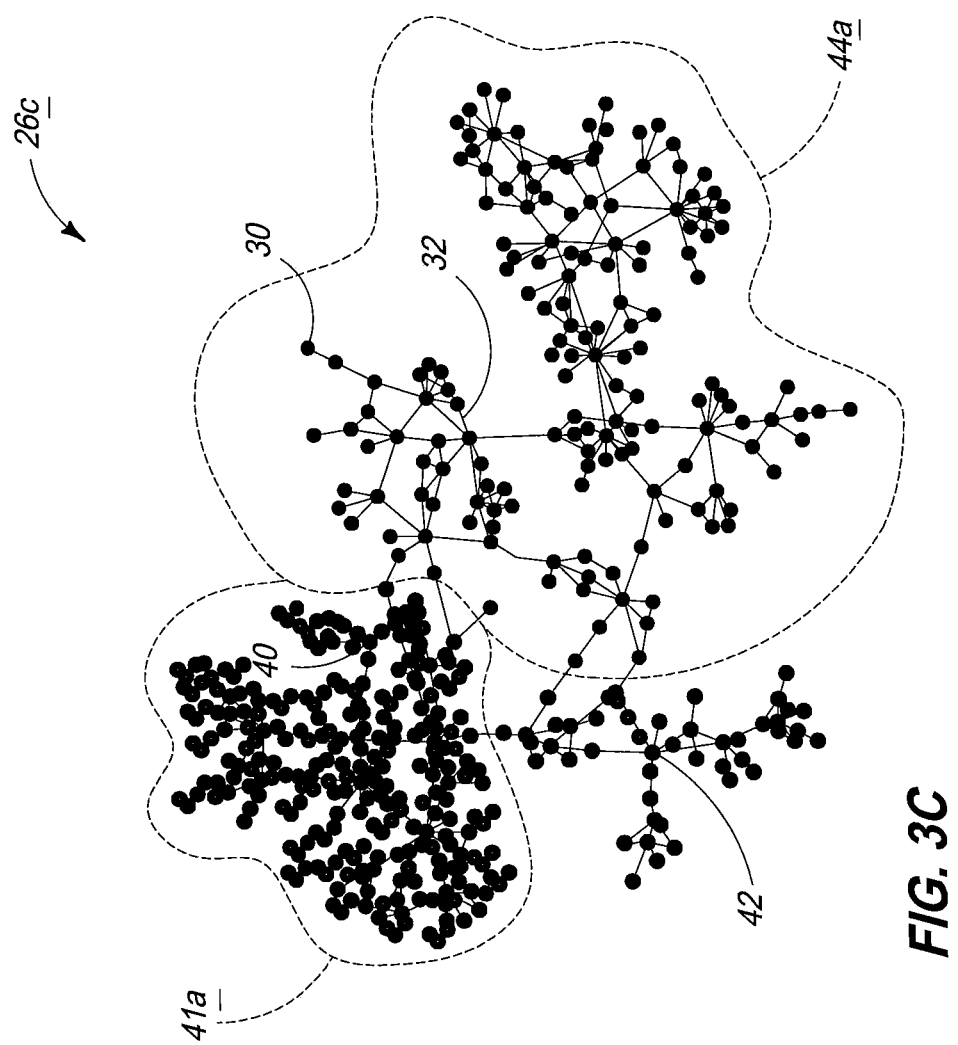

Referring now to FIG. 3C a user has again modified portion 41a of the graphical representation 26c to see additional details proximate node 40 compared with FIG. 3A. In the illustrated example, the new resolution of portion 41a corresponds to the increased resolution of graphical representation 24f of FIG. 2.

Figure 3D:
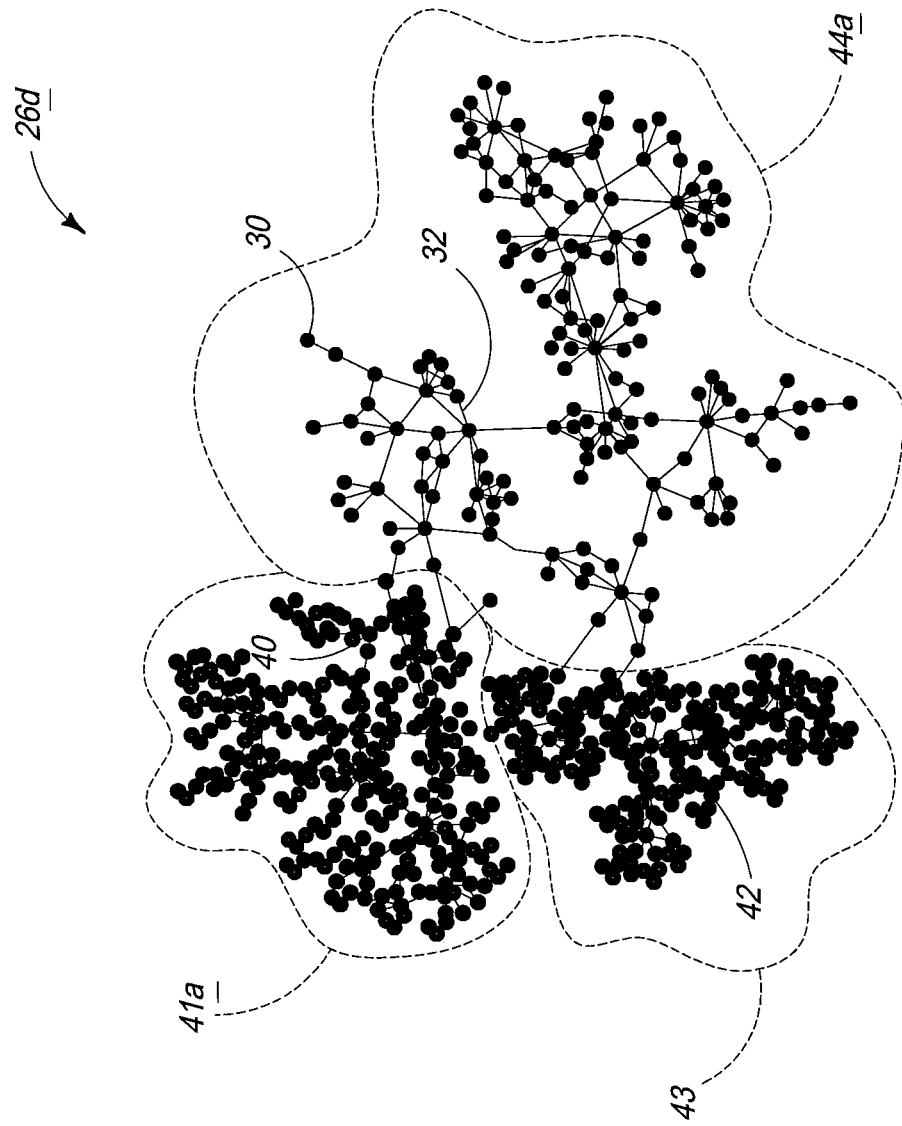

Referring to FIG. 3D, a user has selected and modified a portion 43 of the graphical representation 26d to see additional details proximate node 42. For example, the user has increased the resolution of the selected portion 43 of the graphical representation 26d. In the illustrated example, the new resolution of portion 43 corresponds to the increased resolution of graphical representation 24e of FIG. 2. The graphical representations 26-26d may be displayed to the user after each modification for review, analysis, further modification or other purposes.

As mentioned above, the examples of FIGS. 3A-3D depict a cross-zooming graphing capability including displaying different portions of the graphical representation according to different hierarchical levels and different corresponding resolutions. Additional details regarding cross-zooming, compression of nodes and expansion of nodes between different hierarchical levels are discussed in Pak Chung Wong, etc., "A Multi-Level Middle-Out Cross-Zooming Approach For Large Graph Analytics," *IEEE VAST*, p. 147-154 (2009), the teachings of which are incorporated herein by reference.

Figure 4:
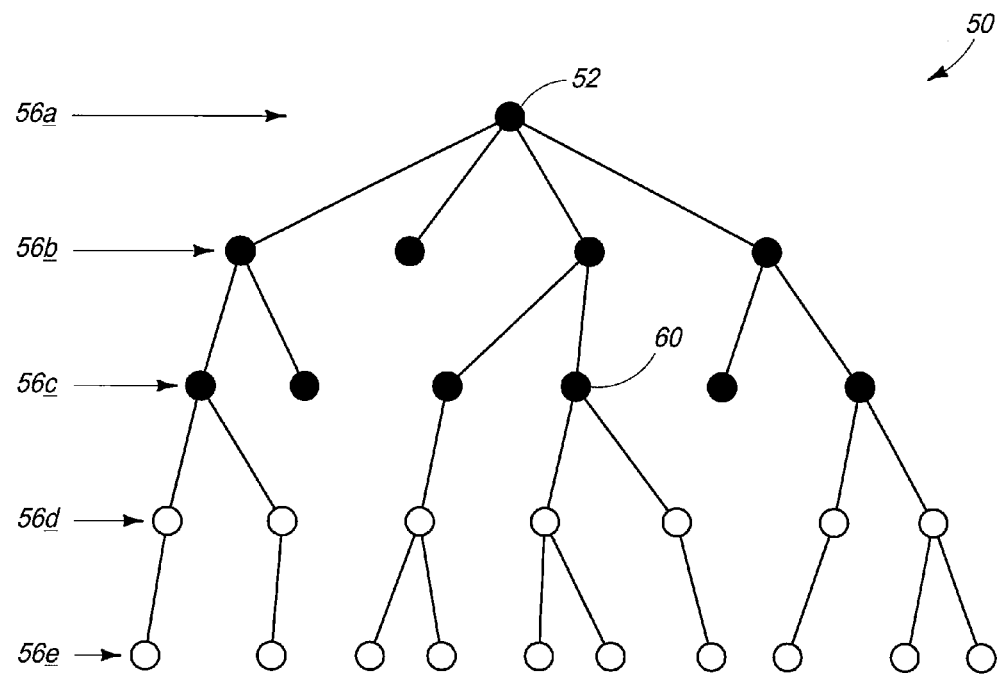
FIGS. 4-4C are a hierarchy illustration of different hierarchical levels corresponding to different resolutions of a graphical representation of a data set according to one embodiment.
Figure 4A:
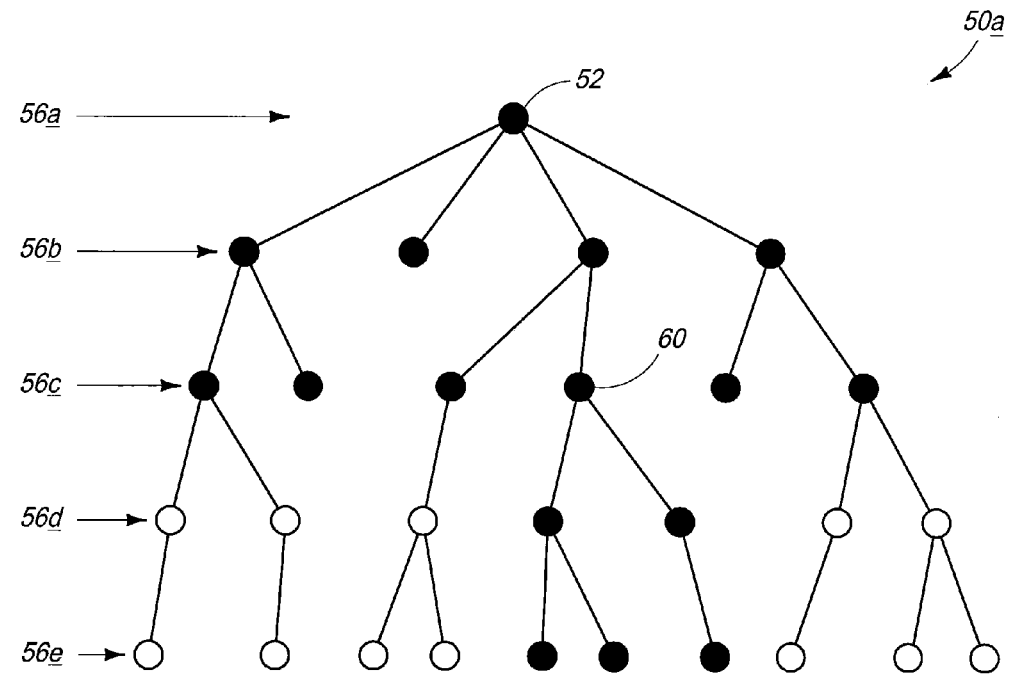
Figure 4B:
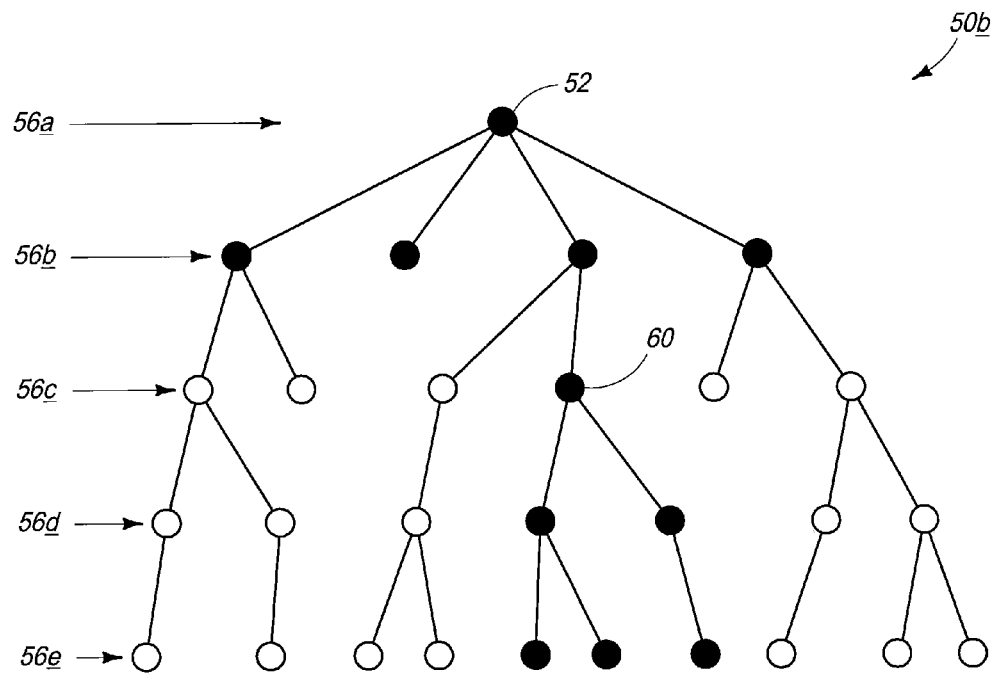
Figure 4C:
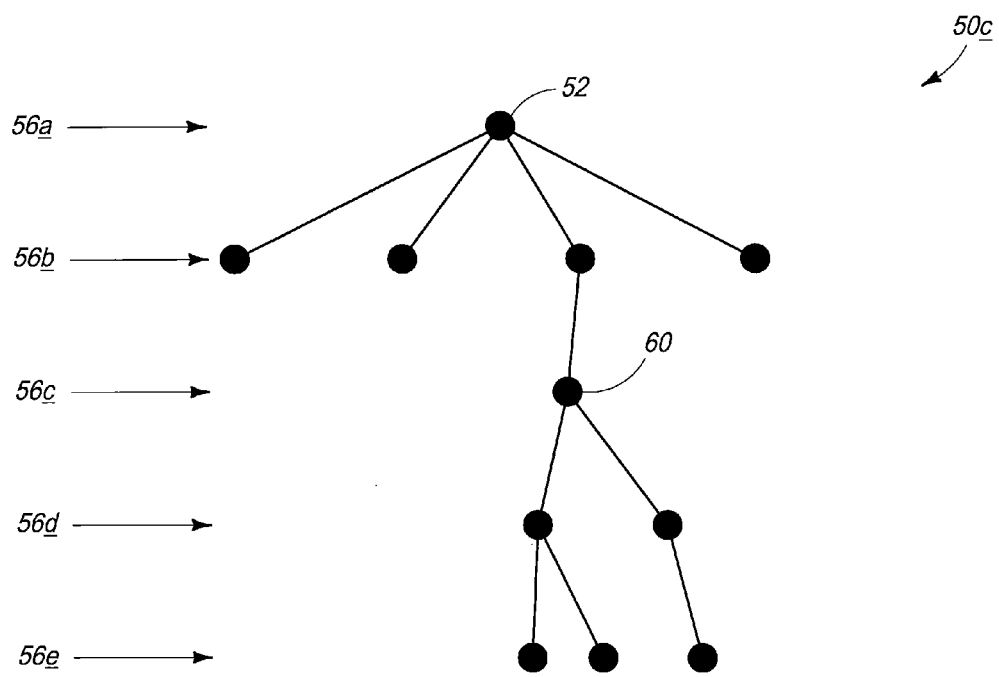

Referring to FIGS. 4-4C, an example hierarchy illustration 50 of different hierarchical levels 56a-56e corresponding to different resolutions of graphical representations of a data set is shown. The example illustration 50 may not actually be displayed to a user but illustrates concepts of manipulation of the resolutions of different portions of the data set corresponding to the example graphical representations 26-26d discussed above.

Referring to FIG. 4, hierarchical level 56a is the lowest resolution (coarsest) level while level 56e is the highest resolution (finest) level of the data and levels 56b-56d are intermediate hierarchical levels with increasing resolutions.

In FIG. 4, a graphical representation of data corresponding to the resolution of the hierarchical level 56c may be initially displayed to a user. The hierarchical level 56c inherently includes data from lower resolution levels 56a and 56b. In FIGS. 4-4C, solid nodes 52 conceptually represent data content which is represented in graphical representations which may be displayed to a user while hollow nodes represent data content which is not represented in the graphical representations.

In the example of FIG. 4, a node 60 is shown which has been selected by a user (e.g., including data selected by a user query).

Referring to FIG. 4A, a user may select a portion of the graphical representation corresponding to node 60 for additional detail and the graphical representation may be modified to show data of the child nodes at hierarchical levels 56d and 56e of the selected node 60 as represented by the solid child nodes of node 60.

Referring to FIG. 4B, a user (or the processing circuitry without user input) may select another portion in the graphical representation for less detail. For example, the user may reduce the detail of portions of the graph from hierarchical level 56c to level 56b which do not correspond to the selected node 60. The graphical representation may be modified to remove details of data of the nodes at hierarchical level 56c which were not selected by the user as shown by the nodes being hollow nodes.

Referring to FIG. 4C, the hollow nodes have been removed and the data of the data set is included in a graphical representation at the hierarchical level 56b having a second lowest resolution while data related to node 60 may be shown in additional detail at hierarchical level 56e having the greatest resolution in the illustrated embodiment. This example illustration illustrates the ability of a user to modify the graphical representations of the data set to have different portions of the graphical representation represent the data of the data set at different resolutions in one embodiment of the disclosure.

Figure 5:
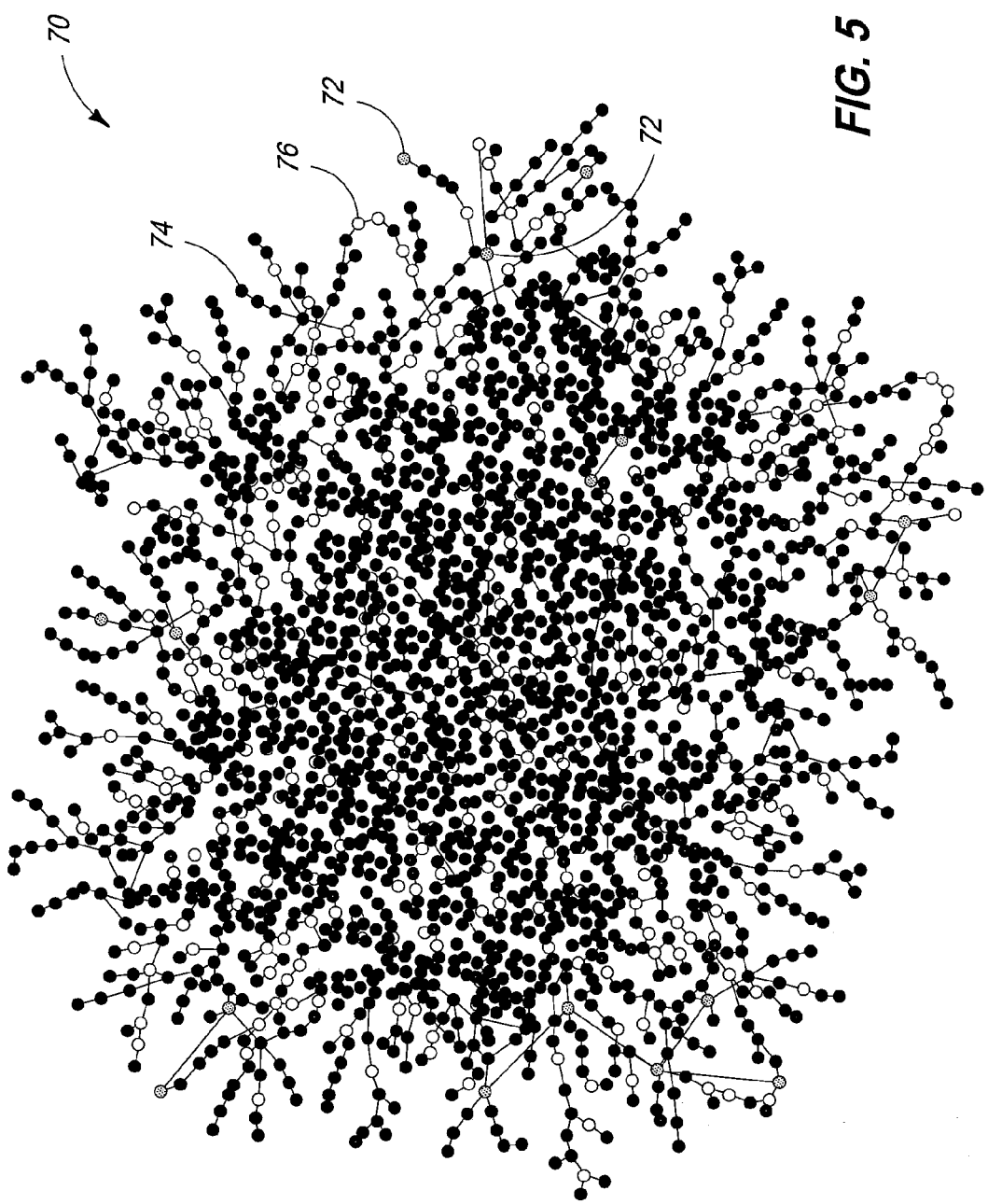
FIGS. 5-5B are illustrative representations where data of a data set are represented at different resolutions within a graphical representation of the data set according to one embodiment.
Figure 5A:
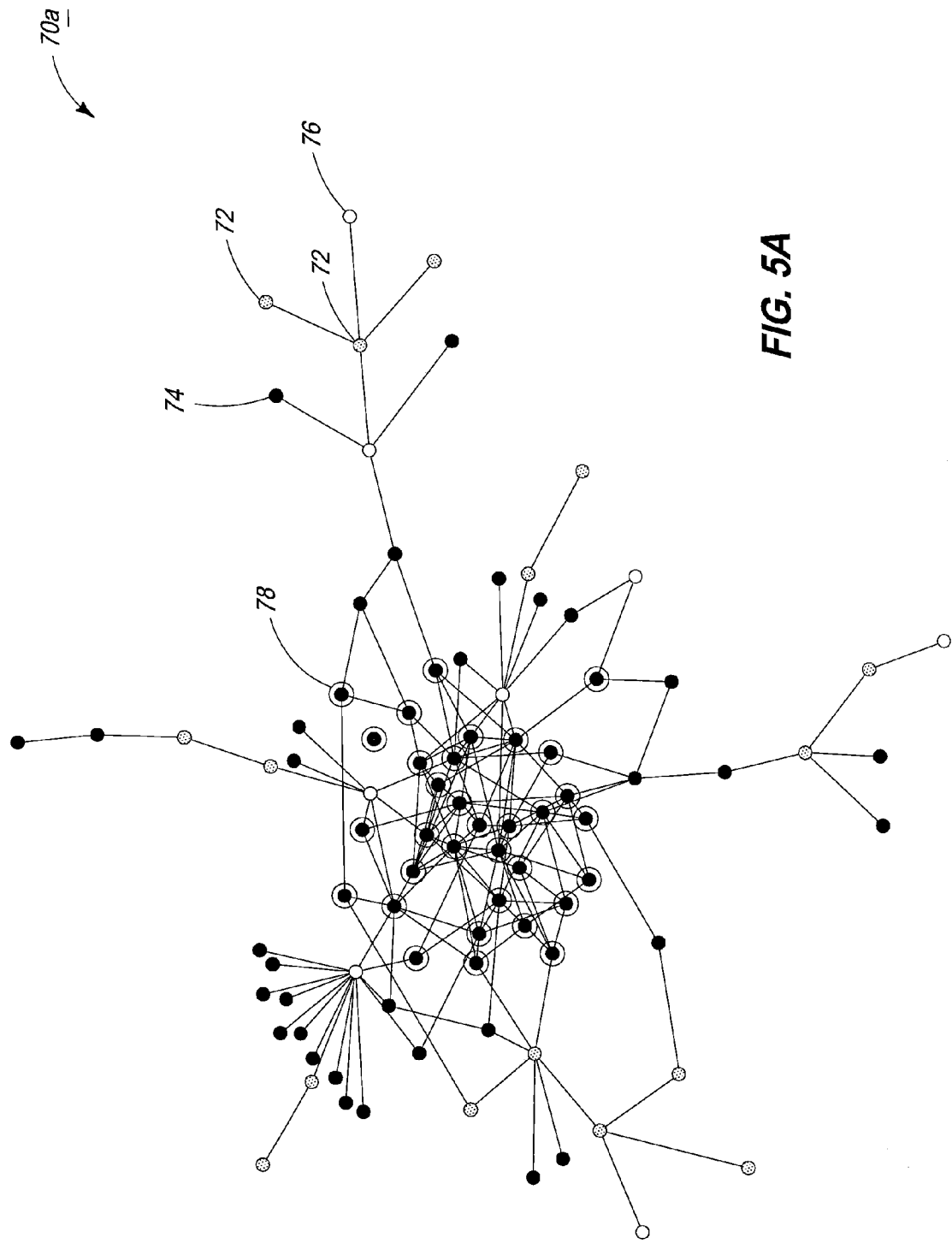
Figure 5B:
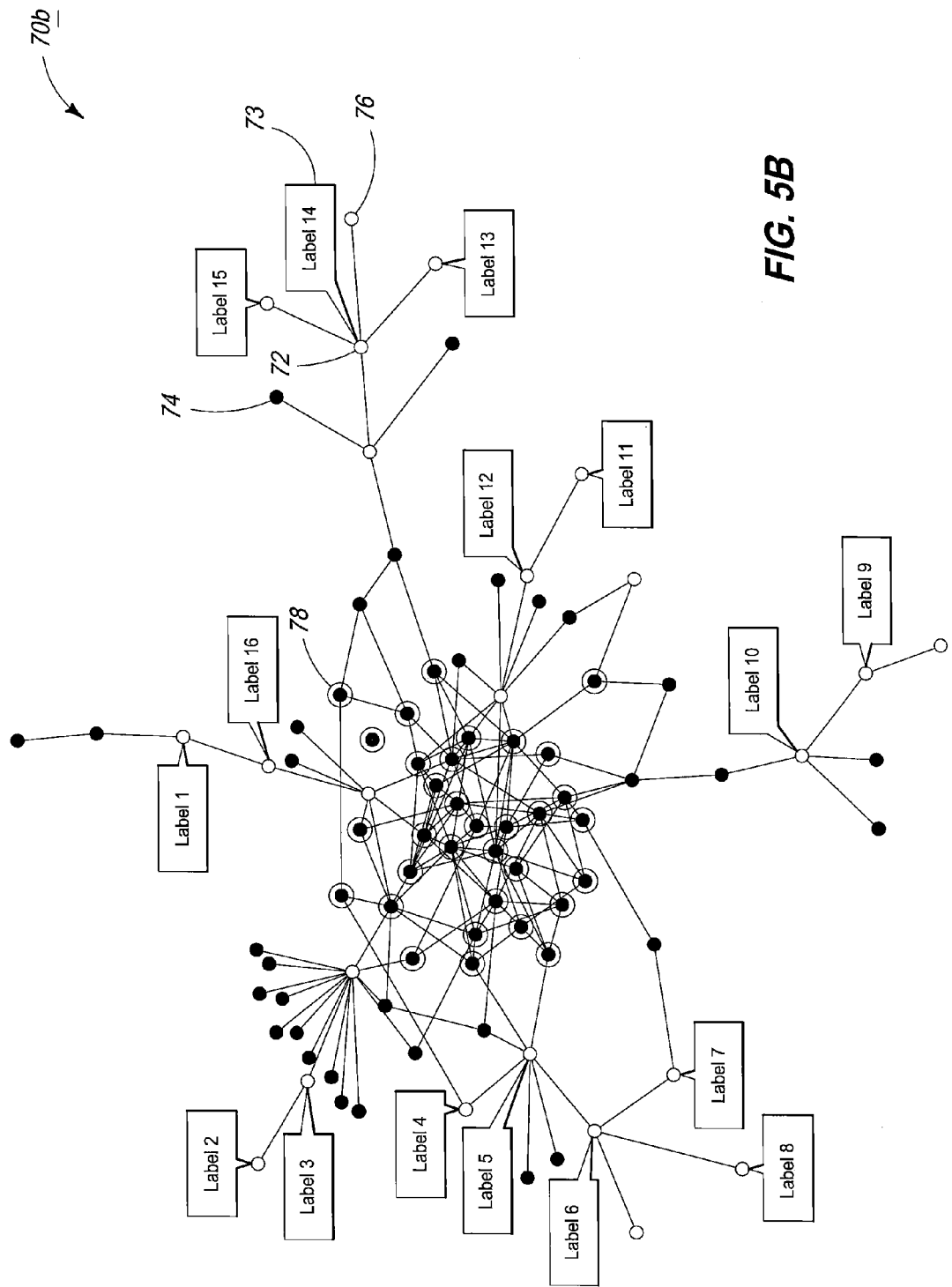

Referring to FIGS. 5-5B, a plurality of graphical representations 70-70b of data of a data set which may be displayed using a display screen are shown in another example of the disclosure.

The graphical representation 70 of FIG. 5 is an initial graphical representation which is presented to the user at an intermediate hierarchical resolution. The nodes are represented differently in the illustrated example graphical representation 70. In one embodiment, the nodes 72 selected by a user (e.g., via database query) may be represented in a first color (e.g., red) and may be referred to as foreground nodes while nodes 74, 76 not selected by a user may be represented in a second color (e.g., grey) and referred to as background nodes in one example.

Furthermore, the nodes 72, 74, 76 may be individually represented as a solid or hollow node in one embodiment. In this example, solid nodes may be referred to as supernodes and represent more than one data item (e.g., a result of compression of the data of a higher hierarchical level including pairing of nodes of higher resolution in the higher hierarchical level and which represent separate data items to achieve the displayed graphical representation 70 at the intermediate hierarchical level). The supernodes may be expanded into plural nodes corresponding to the data items represented by the supernode. The hollow nodes may be considered as leaf nodes which correspond to a single data item and which cannot be expanded. Additional details are discussed in one embodiment in Pak Chung Wong, etc., "A Multi-Level Middle-Out Cross-Zooming Approach For Large Graph Analytics," incorporated by reference above.

More specifically, nodes of a coarsened graph are often compressed in the above-described example coarsening approach and may be referred to as supernodes as discussed above. A supernode of any coarsened graph may contain one or more supernodes at finer levels, leaf-nodes, and disconnected nodes. In one embodiment, users can systematically visit individual nodes and drill down to the details instead of visualizing all the multi-level details all at once.

Referring to FIG. 5A, the user has increased the resolution with respect to foreground nodes 72 and reduced the resolution of the background nodes 74, 76 in graphical representation 70a. The foreground nodes 72 may be actually displayed as hollow, red nodes in one embodiment since the nodes 72 have been expanded to only individually correspond to a single data item. In this illustrative example, the resolution of the data of interest to the user (i.e., represented by foreground nodes 72) has been increased and the resolution of the background nodes 74, 76 has been decreased compared with FIG. 5.

The provision of foreground and background visualization layers in one embodiment allows analysts to maintain focus on a selected set of graph entities when analyzing a relatively large amount of graph information. However, the foreground/background visualization layers may not be sufficient to enable users to keep track of the changes during a graph analytics discourse because of a visual phenomenon known as change blindness. Change blindness in a visualization can be caused by a number of cognitive and perception factors and the amount of changes at any one time may play a significant role for the visual phenomenon.

Accordingly, in one embodiment, nodes which have experienced a change from a previous visualization (e.g., expanded or retracted) may be identified in the graph to users. For example, changed nodes may include a halo 78 which may be represented as an additional, different color, such as yellow to assist users with identifying changes resulting from inputs in one embodiment. The halo 78 may be provided to nodes which have changed in status (e.g., foreground/background, solid/hollow) from a previous graphical representation to assist analysts by accentuating changes and minimizing effects of change blindness when large amounts of data are represented. This designation for the identified nodes may fade away before new changes are received from the user in one embodiment.

Referring to FIG. 5B, labels 73 for the foreground nodes 72 and corresponding to or otherwise identifying data represented by the foreground nodes 72 have been turned on by a user in the example graphical representation 70b for inspection by the user during analysis. The labels 73 may include any appropriate information representing the nodes 72 and which may be useful to the analysts.

Referring to FIG. 6, one embodiment of a graphical user interface window 80 which may be displayed is shown. The example interface 80 may be used to facilitate the communication between the computer, the visualization, and the human users. For example, analysts are free to access any graph nodes in the visualization, in both foreground and background areas, and across the multi-level hierarchical boundaries in one embodiment. One goal in one interface implementation is to reduce the amount of hand-movement and reduce analyst fatigue during user interaction. As discussed above, zooming of both the foreground and background at the same time is supported in at least one embodiment. Instead of using one GUI widget or control (e.g., slider) for the foreground and another one for the background, one widget may be used to control the foreground and a mouse scrolling wheel may be used to control the background in one embodiment. For example, a slider may be used for controlling the foreground information to provide increased precision to manipulate the foreground resolution in one embodiment (e.g., a slider can interactively show precise readings compared with a mouse scrolling button which provides prompt action). Furthermore, in this example of a slider and scroll mouse for navigating the multi-level hierarchy, analysts may control both the foreground and background by moving the slider and scrolling the mouse button at the same time without panning the mouse (i.e., switching from one widget to the other one). Other interfaces may be used in other embodiments.

The window 80 is a data query panel for a scientific collaboration graph in the illustrated example. A user may interact with window 80 to submit user inputs and to control the display of graphical representations as discussed above. For example, a user may bring graph entities or data items to the foreground by using the interface window 80. In addition, the user may also click on individual nodes to bring the nodes to the foreground. The example window 80 allows user analysts to conduct context-sensitive keyword searches (e.g., Author Name, Author ID), to conduct time-period searches using the illustrated sliders, and to filter binary attributes of the databases. Other interfaces may be provided for user interaction in other embodiments.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A data graphing method comprising;
accessing a data set;
displaying a graphical representation including data of the data set which is arranged according to a first of a plurality of different hierarchical levels, wherein the first hierarchical level represents the data of the data set at a first of a plurality of different resolutions which respectively correspond to respective ones of the hierarchical levels;
selecting a portion of the graphical representation wherein the data of the portion is arranged according to the first hierarchical level at the first resolution, wherein the selecting comprises selecting as a result of a query from a user;
modifying the graphical representation by arranging the data of the portion including a plurality of foreground nodes according to a second of the hierarchical levels at a second of the resolutions which is an increased resolution compared with the first resolution;
after the modifying, displaying the graphical representation wherein the data of the portion is arranged according to the second hierarchical level at the second resolution and a plurality of background nodes of the data which were not selected are arranged according to the first hierarchical level at the first resolution; and
wherein the displaying after the modifying comprises displaying the data of the portion at a location and having a shape which correspond to a location and a shape of the portion of the graphical representation before the modifying.

2. The method of claim 1 further comprising accessing the query.

3. The method of claim 1 wherein the modifying comprises changing the number of nodes of the graphical representation wherein at least some information regarding the data of the portion which is discernible in the second resolution is not discernible in the first resolution.

4. The method of claim 1 wherein the modifying comprises changing the number of nodes of the graphical representation.

5. The method of claim 1 wherein the selected portion comprises a first portion of the graphical representation, and further comprising:
selecting a second portion of the displayed graphical representation;
further modifying the graphical representation by arranging the data of the second portion according to a third of the hierarchical levels at a third of the resolutions; and
after the further modifying, displaying the graphical representation wherein the data of the first portion is arranged according to the second hierarchical level at the second resolution and the data of the second portion is arranged according to the third hierarchical level at the third resolution.

6. The method of claim 5 wherein the second resolution is greater than the first resolution and the third resolution is less than the first resolution.

7. The method of claim 1 wherein the first resolution represents the data at an increased resolution compared with a resolution of at least one other of the hierarchical levels.

8. The method of claim 1 further comprising accessing user input selecting the first hierarchical level for the displaying of the graphical representation before the modifying.

9. The method of claim 1 wherein the displayings individually comprise displaying the graphical representations using a display screen, and further comprising selecting the first hierarchical level corresponding to a display capability of the display screen.

10. The method of claim 1 wherein at least some of the data of the portion arranged according to the second hierarchical level is not displayed in the graphical representation before the selecting.

11. The method of claim 1 wherein the modifying comprises modifying the graphical representation by replacing the data of the portion represented at the first resolution with the data of the portion represented at the second resolution.

12. The method of claim 1 wherein some of the foreground nodes have a first graphical characteristic as a result of the some of the foreground nodes individually corresponding to a plurality of data items of the data set and others of the foreground nodes have a second graphical characteristic as a result of the others of the foreground nodes individually corresponding to a single data item of the data set.

13. The method of claim 1 wherein a first number of nodes is used to represent the data of the portion arranged according to the first hierarchical level at the first resolution and a second number of nodes, which is different than the first number of nodes, is used to represent the data of the portion arranged according to the second hierarchical level at the second resolution.

14. The method of claim 1 wherein the portion of the graphical representation corresponds to less than an entirety of the data of the data set.

15. The method of claim 1 wherein the selecting comprises selecting during the displaying the graphical representation including the data of the data set which is arranged according to the first hierarchical level.

16. The method of claim 1 wherein the data of the portion is less than all of the data of the data set included in the graphical representation.

17. An article of manufacture comprising:
at least one computer-readable storage medium storing programming configured to cause processing circuitry to perform processing comprising:
first displaying a first graphical representation of a data set wherein data of the data set is arranged at an intermediate resolution;
selecting a portion of the first graphical representation as a result of a query from a user;
arranging data which corresponds to the selected portion of the first graphical representation to include a plurality of foreground nodes at an increased resolution compared with the intermediate resolution;
after the arranging, second displaying a second graphical representation including the data which corresponds to the selected portion at the increased resolution, and wherein a plurality of background nodes of the data which were not selected are arranged according to the intermediate resolution; and
wherein the data which corresponds to the selected portion is displayed in the second graphical representation at a location and having a shape which correspond to a location and a shape of the selected portion of the first graphical representation.

18. The article of claim 17 wherein the displaying the second graphical representation represents an entirety of the data of the data set, and some of the data of the second graphical representation is represented at a decreased resolution compared with the intermediate resolution as constrained by a display capability of the display screen.

19. The article of claim 17 wherein a first number of nodes is used to represent the data of the portion arranged at the intermediate resolution in the first graphical representation and a second number of nodes, which is different than the first number of nodes, is used to represent the data of the portion arranged at the increased resolution in the second graphical representation.

20. The article of claim 17 wherein the second displaying comprises simultaneously displaying the data of the data set at the intermediate resolution and the increased resolution.

21. A computing device comprising:
a display screen configured to display a graphical representation of a data set;
a user interface configured to receive user inputs of a user interacting with the computing device; and
processing circuitry coupled with the display screen and the user interface and configured to access the user inputs and to select a portion of the graphical representation as a result of one of the user inputs being a query from a user, wherein the processing circuitry is further configured to modify the graphical representation to represent data of the data set corresponding to the portion as a plurality of foreground nodes at a first resolution and to represent other data of the data set as plurality of background nodes at a second resolution which is less than the first resolution and to control the display screen to display the modified graphical representation which represents the data of the data set at the first and second resolutions and which includes the foreground nodes and the background nodes; and
wherein the data corresponding to the portion is displayed in the modified graphical representation at a location and having a shape which correspond to a location and a shape of the selected portion of the graphical representation before the modification of the graphical representation.

22. The device of claim 21 wherein the processing circuitry is configured to control the display screen to display the graphical representation before the modification which represents an entirety of the data of the data set at the second resolution which comprises an intermediate resolution.

23. The device of claim 21 wherein the first resolution is greater than the second resolution, and the processing circuitry is configured to access the user inputs which select another portion of graphical representation and which instruct the processing circuitry to further modify the graphical representation to represent data of the data set corresponding to the another portion at a third resolution which is less than the second resolution as constrained by a display capability of the display screen and to control the display screen to display the further modified graphical representation which represents the data of the data set at the first, second and third resolutions.

24. The device of claim 21 wherein the processing circuitry is configured to control the display screen to display the modified graphical representation comprising a plurality of links intermediate the foreground nodes and a plurality of links intermediate the background nodes.

25. The device of claim 21 wherein the display screen displays the data corresponding to the portion at the second resolution within the graphical representation prior to the query from the user, and a first number of nodes is used to represent the data of the portion at the first resolution and a second number of nodes, which is different than the first number of nodes, is used to represent the data of the portion at the second resolution.

26. The device of claim 21 wherein the processing circuitry is configured to control the display screen to display the modified graphical representation which simultaneously displays the data of the data set at the first and second resolutions.

* * * * *

UNITED STATES PATENT AND TRADEMARK OFFICE
CERTIFICATE OF CORRECTION

PATENT NO. : 9,519,677 B2  
APPLICATION NO. : 13/268110  
DATED : December 13, 2016  
INVENTOR(S) : Pak Chung Wong et al.

It is certified that error appears in the above-identified patent and that said Letters Patent is hereby corrected as shown below:

On the Title Page

(56) References Cited – Replace "Stasko et al. "Jigsaw: Supporting Investigative Analysis Through Interactice Visualization", Information Visualization, Plagrave Magellan vol. 7, No. 2 (2008), pp. 118-132." with --Stasko et al. "Jigsaw: Supporting Investigative Analysis Through Interactive Visualization", Information Visualization, Palgrave Magellan vol. 7, No. 2 (2008), pp. 118-132.--

(56) References Cited – Replace "Tom Saywer Software, http://www.tomsawyer.com/home/index.php (accessed Feb. 26, 2008), 1 page." with --Tom Sawyer Software, http://www.tomsawyer.com/home/index.php (accessed Feb. 26, 2008), 1 page.--

(56) References Cited – Replace "Wong et al., "Graph Signatures for Visual Analytics", IEEE Transactions on Visulization and Computer Graphics vol. 12, No. 6 (2006), pp. 1399-1413." with --Wong et al., "Graph Signatures for Visual Analytics", IEEE Transactions on Visualization and Computer Graphics vol. 12, No. 6 (2006), pp. 1399-1413.--

Signed and Sealed this  
Sixth Day of June, 2017

Michelle K. Lee  
*Director of the United States Patent and Trademark Office*